United States Patent
Yonekura

(10) Patent No.: US 11,953,475 B2
(45) Date of Patent: Apr. 9, 2024

(54) ABSORBANCE DETECTOR AND LIQUID CHROMATOGRAPH

(71) Applicant: SHIMADZU CORPORATION, Kyoto (JP)

(72) Inventor: Takuya Yonekura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 769 days.

(21) Appl. No.: 17/047,429

(22) PCT Filed: Dec. 19, 2018

(86) PCT No.: PCT/JP2018/046716
§ 371 (c)(1),
(2) Date: Oct. 14, 2020

(87) PCT Pub. No.: WO2019/202776
PCT Pub. Date: Oct. 24, 2019

(65) Prior Publication Data
US 2021/0148871 A1    May 20, 2021

(30) Foreign Application Priority Data
Apr. 16, 2018 (JP) ................. 2018-078088

(51) Int. Cl.
*G01N 30/74* (2006.01)
*G01N 30/86* (2006.01)
(Continued)

(52) U.S. Cl.
CPC ............. *G01N 30/74* (2013.01); *G01N 30/86* (2013.01); *G01N 2030/027* (2013.01); *G01N 2030/625* (2013.01)

(58) Field of Classification Search
USPC ........................................... 73/61.52
See application file for complete search history.

(56) References Cited

U.S. PATENT DOCUMENTS

| 9,423,302 B2 * | 8/2016 | Owa ..................... G01J 3/42 |
| 2012/0229803 A1 * | 9/2012 | Sano .................... G01J 3/18 |
| | | 356/300 |

(Continued)

FOREIGN PATENT DOCUMENTS

| JP | 2000-039400 A | 2/2000 |
| JP | 2001-201399 A | 7/2001 |

(Continued)

OTHER PUBLICATIONS

International Search Report for corresponding Application No. PCT/JP2018/046716, dated Mar. 19, 2019.
(Continued)

*Primary Examiner* — Clayton E. LaBalle
*Assistant Examiner* — Warren K Fenwick
(74) *Attorney, Agent, or Firm* — Renner, Otto, Boisselle & Sklar, LLP

(57) ABSTRACT

An absorbance detector includes a sample cell, a light source for irradiating the sample cell, a photo sensor, an optical system for guiding light emitted from the light source to the sample cell and guiding light that has been transmitted through the sample cell to the photo sensor, a reference signal acquirer configured to acquire a detection signal of the photo sensor when the sample solution is not flowing through the sample cell as a reference signal for each analysis of the sample, a calculator configured to find absorbance of the sample based on a measurement signal obtained by the photo sensor in the analysis and the reference signal acquired for the analysis when an analysis of the sample is carried out, and an analysis data storage configured to associate data of the absorbance found by the calculator and data of the reference signal to each other for storage.

8 Claims, 3 Drawing Sheets

(51) Int. Cl.
  *G01N 30/02* (2006.01)
  *G01N 30/62* (2006.01)

(56) References Cited

U.S. PATENT DOCUMENTS

| | | | | |
|---|---|---|---|---|
| 2013/0016352 A1* | 1/2013 | Kita | ......................... | G01J 3/524 |
| | | | | 356/402 |
| 2013/0265566 A1* | 10/2013 | Smith | .................. | G01N 21/359 |
| | | | | 356/402 |
| 2018/0031423 A1 | 2/2018 | Gunji | | |

FOREIGN PATENT DOCUMENTS

| | | | |
|---|---|---|---|
| JP | 2004-061199 A | | 2/2004 |
| JP | 2005037248 A | * | 2/2005 |
| WO | 2016/129033 A1 | | 8/2016 |

OTHER PUBLICATIONS

Written Opinion for corresponding Application No. PCT/JP2018/046716, dated Mar. 19, 2019.
Office Action in corresponding Chinese Patent Application No. 201880092419.0, dated Feb. 27, 2023, with English language machine translation.
Office Action in corresponding Chinese Patent Application No. 201880092419.0, dated Nov. 21, 2023, with English machine translation.

* cited by examiner

F I G. 1
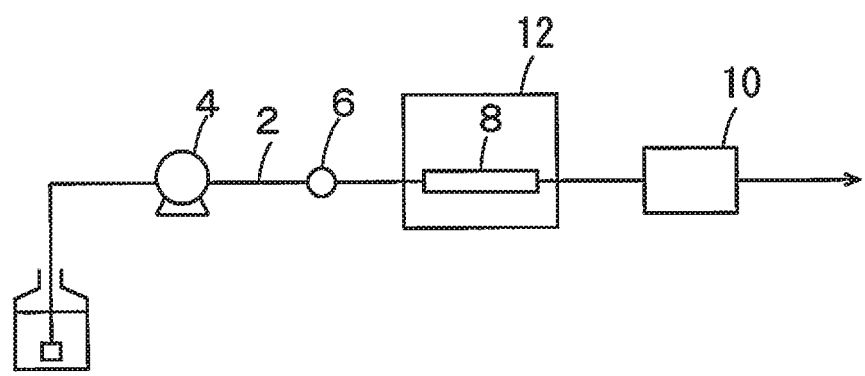

ABSORBANCE DETECTOR AND LIQUID CHROMATOGRAPH

TECHNICAL FIELD

The present invention relates to an absorbance detector that detects a sample component in a fluid based on a change in absorbance of the fluid flowing through a sample cell and a liquid chromatograph including the absorbance detector.

BACKGROUND ART

An absorbance detector has been known as a detector for liquid chromatography (see Patent Document 1, for example). The absorbance detector disclosed in Patent Document 1 is referred to as a multichannel spectrophotometer that measures absorbance of a plurality of wavelengths simultaneously using a photo sensor made of a photodiode array having a plurality of light receiving elements. Such an absorbance detector irradiates a sample cell through which an eluate from a separation column of a liquid chromatograph flows with light from a light source, separates light that has been transmitted through the sample cell into wavelength components by a spectrometer and detects the separated light of each wavelength component by each light receiving element of the photo sensor, thereby being able to acquire an absorbance spectrum of the eluate flowing through the sample cell.

The absorbance detector is not limited to the above-mentioned multichannel type. In the absorbance detector, a signal of the photo sensor obtained when only a mobile phase is flowing through the sample cell is acquired as a reference signal, and absorbance is found using a measurement signal and a reference signal from the photo sensor during an analysis.

CITATION LIST

[Patent Document]
[Patent Document 1] WO 2016/129033 A1

SUMMARY OF INVENTION

Technical Problem

In the absorbance detector, an increase in noise and destabilization of a baseline may occur during use, and reproducibility of analysis may be reduced. Destabilization of a light amount of a light source, contamination of an optical system and contamination of a sample cell are considered as typical causes of an increase in noise and destabilization of a baseline. However, in a case where such an abnormality in result of analysis occurred, it was difficult to identify the cause of the abnormality even when reference was made to absorbance data obtained in an analysis, and it was necessary to carry out various examination on a device after the analysis in order to clarify the cause of the abnormality. Thus, it required a long period of time to clarify the cause of the abnormality in result of analysis.

The present invention was conceived considering the above-mentioned problems, and an object of the present invention is to facilitate clarification of a cause of an abnormality in result of analysis such as an increase in noise in absorbance data and destabilization of a baseline.

Solution to Problem

An absorbance detector according to the present invention includes a sample cell through which a sample solution including a sample flows, a light source for irradiating the sample cell with light, a photo sensor for detecting intensity of light that has been transmitted through the sample, an optical system for guiding the light emitted from the light source to the sample cell and guiding the light that has been transmitted through the sample cell to the photo sensor, a reference signal acquirer configured to acquire a detection signal of the photo sensor when the sample solution is not flowing through the sample cell as a reference signal for each analysis of the sample, a calculator configured to find absorbance of the sample flowing through the sample cell based on a measurement signal obtained by the photo sensor in the analysis and the reference signal acquired for the analysis when the analysis of the sample is carried out, and an analysis data storage configured to associate data of the absorbance found by the calculator in the analysis of the sample and data of the reference signal acquired for the analysis to each other for storage.

In a conventional absorbance detector, although having been temporarily stored until absorbance was calculated, the reference signal data acquired for calculation of the absorbance was discarded after calculation of absorbance. Thus, reference could not be made to the reference signal data that was used for creation of analysis data after the analysis data was created. Contrary to this, in the absorbance detector according to the present invention, the absorbance data obtained in an analysis of the sample and the reference signal data acquired for the analysis are kept while being associated with each other. Thus, when an abnormality such as an increase in noise in the absorbance data and destabilization of a baseline in result of analysis occurs, the user can make reference to the absorbance data and the reference signal data used for creation of the absorbance data and utilize them to clarify the cause of the abnormality.

The absorbance detector of the present invention preferably includes an abnormality determiner configured to find an increasing or decreasing trend of the absorbance and an increasing or decreasing trend of the reference signal associated with an increase in number of analyses based on the absorbance and the reference signal of each analysis stored in the analysis data storage in a case where an analysis of a same sample is carried out multiple times, and determine presence or absence of an abnormality in the sample cell, the light source or the optical system based on the increasing or decreasing trend of the absorbance and/or the increasing or decreasing trend of the reference signal. Then, the cause of abnormality in result of analysis is automatically identified, and the problem is more easily dealt with.

The present invention can be applied to a multichannel absorbance detector. That is, the optical system includes a spectrometer that separates the light that has been transmitted through the sample cell into wavelength components, and the photo sensor can have a plurality of light receiving elements that respectively detect light of each wavelength component separated by the spectrometer. In this case, in a case where data of intensity of the light of all wavelength components obtained as reference signals continues to be kept, the volume of data increases. Therefore, the analysis data storage is preferably configured to store only a reference signal of light of a partial wavelength component out of the reference signals of light of the plurality of wavelength components acquired by the plurality of light receiving elements of the photo sensor.

Further, in a case where a reference value for determining whether intensity of a reference signal is normal is set, whether emission intensity of the light source is normal can be determined based on the reference signal when the reference signal is acquired.

The absorbance detector of the present invention may include a reference value setter configured to set a reference value for determination of whether intensity of the reference signal is normal, and a light amount determiner configured to compare the reference signal with the reference value set by the reference value setter and determine an abnormality in light amount based on whether the reference signal is equal to or larger than the reference value.

In a case where the above-mentioned configuration is applied to the multichannel absorbance detector, the reference value setter is configured to set the reference value in regard to the specific wavelength selected in accordance with the mobile phase flowing through the sample cell, that is, the mobile phase used in the analysis, and the absorbance determiner can be configured to determine an abnormality in light amount by comparing the reference signal of light of the specific wavelength out of the reference signals of light of the plurality of wavelength components acquired by the plurality of light receiving elements of the photo sensor with the reference value. The specific wavelength selected in accordance with the mobile phase is the wavelength selected by the user as the wavelength that is not absorbed by the mobile phase, for example, or the wavelength that is automatically specified based on the wavelength selected by the user.

A liquid chromatograph includes a sample injector for injecting a sample into an analysis flow path through which a mobile phase flows, a separation column that is provided at a position farther downstream than the sample injector on the analysis flow path and is to separate the sample injected into the analysis flow path by the sample injector, and the above-mentioned absorbance detector that is provided at a position farther downstream than the sample injector on the analysis flow path and is to detect a sample component eluted from the separation column.

Advantageous Effects of Invention

With the absorbance detector according to the present invention, because the absorbance data obtained in an analysis of a sample and the reference signal data acquired for the analysis are kept while being associated with each other, when an abnormality occurs in absorbance data obtained by the analysis, the user can make reference to the absorbance data and the reference signal data used for creation of the absorbance data and easily clarify the cause of the abnormality.

Because the light chromatograph according to the present invention includes the above-mentioned absorbance detector, it is easy to clarify the cause in a case where an abnormality occurs in absorbance data obtained in an analysis.

BRIEF DESCRIPTION OF THE DRAWINGS

FIG. 1 A diagram showing the configuration of a flow path of one inventive example of a liquid chromatograph.

DESCRIPTION OF EMBODIMENTS

Figure 2:
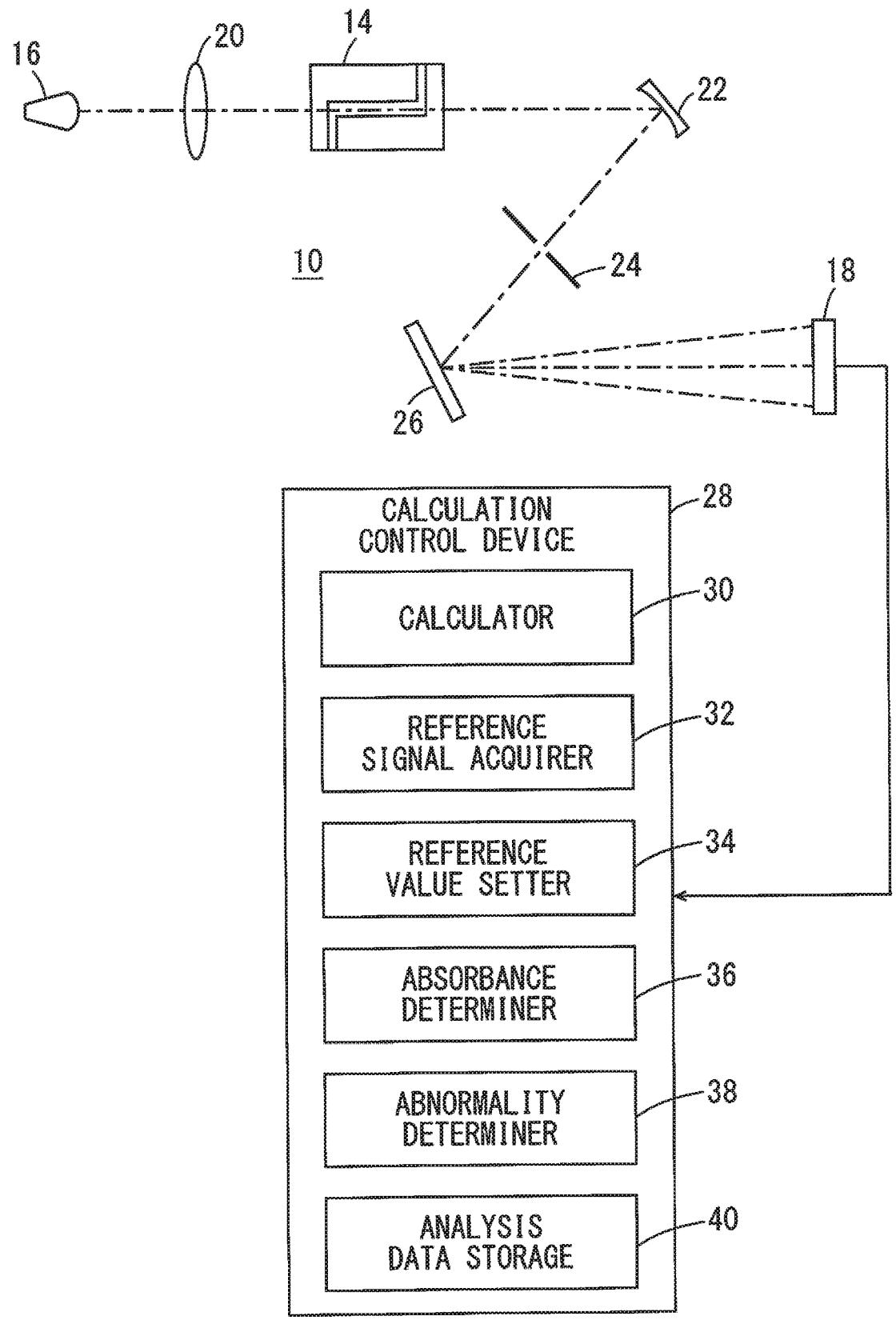
FIG. 2 A diagram showing the schematic configuration of an absorbance detector in the same inventive example.

One inventive example of an absorbance detector and a liquid chromatograph according to the present invention will be described below with reference to the drawings.

First, the configuration of the liquid chromatograph will be described with reference to FIG. 1.

The liquid chromatograph includes an analysis flow path 2, a liquid sending pump 4, a sample injector 6, a separation column 8 and the absorbance detector 10. The liquid sending pump 4 is to send a mobile phase in the analysis flow path 2. The sample injector 6 is to inject a sample into the analysis flow path 2. The separation column 8 is provided at a position farther downstream than the sample injector 6 on the analysis flow path 2 and is to separate the sample injected by the sample injector 6 into the analysis flow path 2 into components. The temperature of the separation column 8 is controlled in a column oven 12. The absorbance detector 10 is provided at a position farther downstream than the separation column 8 on the analysis flow path 2 and is to detect the sample components into which the sample is separated in the separation column 8.

The configuration of the absorbance detector 10 will be described with reference to FIG. 2.

The absorbance detector 10 includes a sample cell 14, a light source 16, a photo sensor 18, a collecting lens 20, a mirror 22, a slit 24, a spectrometer 26 and a calculation control device 28. The sample cell 14 has a space through which an eluate from the separation column 8 flows. The light source 16 is to emit light for measurement, and the photo sensor 18 is to detect intensity of light that has been transmitted through the sample cell 14.

The collecting lens 20 is arranged between the light source 16 and the sample cell 14 and is to collect light emitted from the light source 16 and guide the light to the sample cell 14. The mirror 22 is provided at a position opposite to the collecting lens 20 with the sample cell 14 located therebetween, and the light that has been transmitted through the sample cell 14 is reflected from the mirror 22. The spectrometer 26 is to separate the light reflected from the mirror 22 into wavelength components and guide the components to the photo sensor 18. The slit 24 is provided on a path of the light that is reflected from the mirror 22. The collecting lens 20, the mirror 22, the slit 24 and the spectrometer 26 constitute an optical system for guiding the light from the light source 16 to the sample cell 14 and guiding the light that has been transmitted through the sample cell 14 to the photo sensor 18.

The photo sensor 18 is a photodiode array having a plurality of light receiving elements for receiving light of each wavelength component that is separated by the spectrometer 26. A detection signal of each light receiving element of the photo sensor 18 is imported to the calculation control device 28.

The calculation control device 28 can be realized by a dedicated computer or a general personal computer. The calculation control device 28 may be a system controller for managing an operation of the entire system of the liquid chromatograph shown in FIG. 1 or a computer connected to the system controller.

The calculation control device 28 includes a calculator 30, a reference signal acquirer 32, a reference value setter 34, a light amount determiner 36, an abnormality determiner 38 and an analysis data storage 40. The calculator 30, the reference signal acquirer 32, the reference value setter 34, the light amount determiner 36 and the abnormality determiner 38 are the functions obtained by execution of a program by an arithmetic element such as a microcomputer. Further, the analysis data storage 40 is the function implemented by a partial storage region in the storage device provided in the calculation control device 28.

The calculator 30 is configured to find the absorbance of a sample solution flowing through the sample cell 14 using a detection signal (measurement signal) of each light receiving element of the photo sensor 18 obtained during an analysis and a reference signal acquired for the analysis. The reference signal is the intensity of a signal of each light receiving element of the photo sensor 18 that is acquired with only a mobile phase flowing through the sample cell 14.

The reference signal acquirer 32 is configured to acquire a reference signal for an analysis when an instruction for starting the analysis is input to the calculation control device 28 based on a user input. The data of the reference signal acquired by the reference signal acquirer 32 is stored in the analysis data storage 40 while being associated with the absorbance data obtained in the analysis. Although the analysis data storage 40 may store all of the data of the reference signal acquired for each analysis, it may only store the data of the reference signal relating to a specific wavelength component as shown in the Table 1 in order to prevent an increase in volume of data.

TABLE 1

| WAVELENGTH[nm] | REFERENCE SIGNAL[V] |
| --- | --- |
| 190 | 2.5 |
| 210 | 3.5 |
| 230 | 8.0 |
| 250 | 6.0 |
| 270 | 4.0 |

The reference value setter 34 is configured to set a reference value of a reference signal acquired by the reference signal acquirer 32. The reference value is the value indicating a reference for determination of whether the emission intensity of the light source 16 is normal based on a reference signal, and is to be set based on the reference signal in regard to a specific wavelength acquired when the light source 16 is normal, for example. The specific wavelength is a wavelength that is not absorbed by a mobile phase used for an analysis, and may be a wavelength selected directly by a user or may be a wavelength specified automatically by the reference value setter 34 based on the mobile phase selected by the user.

The light amount determiner 36 is configured to compare the reference signal of the specific wavelength with the reference value set by the reference value setter 34 at a desirable point in time after the reference signal is acquired by the reference signal acquirer 32, that is, the point in time immediately after the reference signal is acquired, for example, and determine whether the emission intensity of the light source 16 is normal. The light amount determiner 36 determines that the emission intensity is normal in a case where the reference signal is equal to or larger than the reference value, and determines that the emission intensity is not normal in a case where the reference signal is smaller than the reference value.

The abnormality determiner 38 is configured to, after an analysis is continuously carried out multiple times in regard to a same sample, determine whether a series of analyses are carried out normally and identify the cause in a case where an abnormality has occurred, using the absorbance data obtained in each analysis and the data of the reference signal acquired for each analysis.

For example, in a case where the absorbance shows a decreasing trend while intensity of the reference signal shows an increasing trend each time an analysis is carried out, it can be judged that the sample cell 14 is contaminated at a point in time at which the continuous analysis is started. This is because it is conceivable that contamination in the sample cell 14 is cleaned as the continuous analysis proceeds and a mobile phase continues to flow through the sample cell 14. Further, in a case where the absorbance shows an increasing trend while intensity of the reference signal shows a decreasing trend each time an analysis is carried out, it can be judged that a light amount of the light source 16 is unstable. Further, in a case where the absorbance does not change while the intensity of the reference signal shows a decreasing trend each time an analysis is carried out, it can be judged that the optical system such as the collecting lens 20, the mirror 22 and the spectrometer 26 are contaminated.

The abnormality determiner 38 is configured to identify an increasing or decreasing trend of absorbance data of each analysis stored in the analysis data storage 40 and an increasing or decreasing trend of a reference signal stored in the analysis data storage 40 and automatically determine the cause of an abnormality based on these trends as described above.

The abnormality determiner 38 does not necessarily have to be provided. In short, the reference signal data of each analysis may be stored in the analysis data storage 40 while being associated with the absorbance data. Then, when an abnormality in analysis data such as an increase in noise and destabilization of a baseline is discovered, the user can easily identify the cause of abnormality by making reference to the absorbance data and the reference signal.

Figure 3:
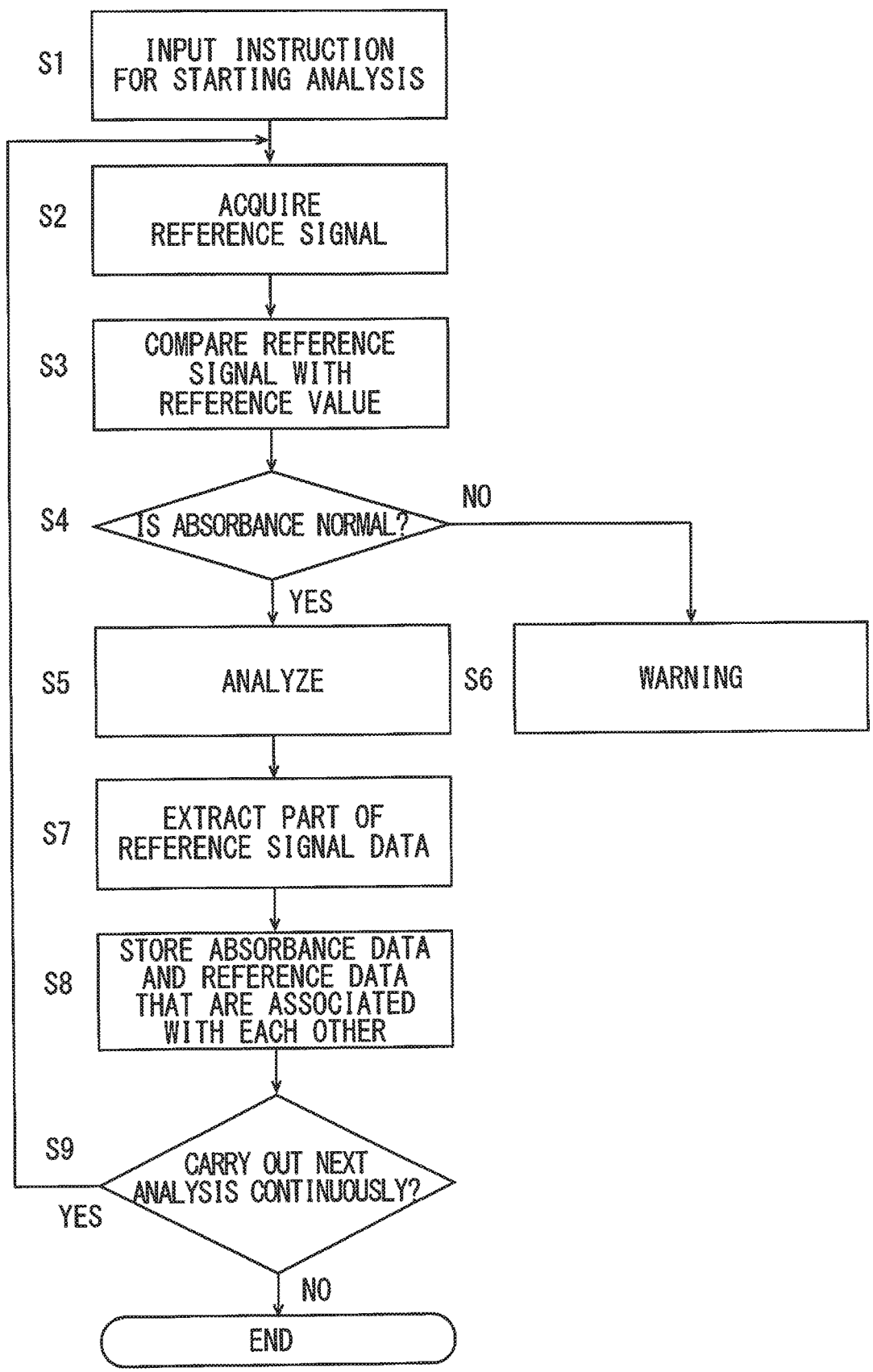
FIG. 3 A flowchart showing one example of an operation of the same inventive example.

One example of an operation during an analysis of the liquid chromatograph of the same inventive example will be described with reference to FIGS. 1 and 2 and the flowchart of FIG. 3.

When an instruction for starting an analysis is input to the calculation control device 28 based on a user input (step S1), the reference signal acquirer 32 acquires a reference signal (step S2). When the reference signal is acquired, the light amount determiner 36 compares the reference signal of the specific wavelength with the preset reference value (step S3), and determines whether the absorbance of the light source 16 is normal (step S4). In a case where the reference signal of the specific wavelength is smaller than the reference value, the light amount determiner 36 determines that there is an abnormality in the light source 16 and issues a warning to the user (step S6). A warning can be provided by display of a message indicating that the light amount of the light source 16 is insufficient on a display (not shown) connected to the calculation control device 28, for example. The wavelength and the reference value to be used for determination of the light amount are set by the reference value setter 34 based on a user input at a point in time before the instruction for starting an analysis is provided.

In a case where the reference signal of the specific wavelength is equal to or larger than the reference value, it is judged that the light source 16 is normal, and an analysis of a sample is started (step S5). During the analysis, the calculator 30 finds absorbance using a detection signal of each light receiving element of the photo sensor 18 and the reference signal acquired for the analysis and creates absorbance data in regard to the analysis.

After the analysis ends, only the reference signal data in regard to the specific wavelength such as the wavelengths shown in the Table 1 is extracted (step S7), and the reference signal data is associated with the absorbance data obtained in the analysis to be stored in the analysis data storage 40 (step S8). In a case where an analysis is carried out continuously multiple times, the operation of the above-mentioned steps S2 to S8 is repeated (step S9).

While a multichannel absorbance detector is described by way of example in the above-mentioned inventive example, the present invention is not limited to this. The present invention can be similarly applied to an absorbance detector that is configured to extract light of a wavelength component to be used for measurement, irradiates a sample cell with the light and detect the light that has been transmitted through the sample cell by a single light receiving element.

REFERENCE SIGNS LIST

2 Analysis flow path
4 Liquid sending pump
6 Sample injector
8 Separation column
10 Absorbance detector
12 Column oven
14 Sample cell
16 Light source
18 Photo sensor
20 Collecting lens
22 Mirror
24 Slit
26 Spectrometer
28 Calculation control device
30 Calculator
32 Reference signal acquirer
34 Reference value setter
36 Light amount determiner
38 Abnormality determiner
40 Analysis data storage

The invention claimed is:

1. An absorbance detector comprising:
a sample cell through which a sample solution including a sample flows;
a light source for irradiating the sample cell with light;
a photo sensor for detecting intensity of light that has been transmitted through the sample;
an optical system for guiding the light emitted from the light source to the sample cell and guiding the light that has been transmitted through the sample cell to the photo sensor;
a reference signal acquirer configured to acquire a detection signal of the photo sensor when the sample solution is not flowing through the sample cell as a reference signal for each analysis of the sample;
a calculator configured to find absorbance of the sample flowing through the sample cell based on a measurement signal obtained by the photo sensor in the analysis and the reference signal acquired for the analysis when the analysis of the sample is carried out;
an analysis data storage configured to associate data of the absorbance found by the calculator in the analysis of the sample and data of the reference signal acquired for the analysis to each other for storage; and
an abnormality determiner configured to find an increasing or decreasing trend of the absorbance and an increasing or decreasing trend of the reference signal associated with an increase in number of analyses based on the absorbance of each analysis and the reference signal stored in the analysis data storage in a case where an analysis of a same sample is carried out multiple times, and determine presence or absence of an abnormality in the sample cell, the light source or the optical system based on a combination of the increasing or decreasing trend of the absorbance and the increasing or decreasing trend of the reference signal.

2. The absorbance detector according to claim 1, comprising:
a reference value setter configured to set a reference value for determination of whether intensity of the reference signal is normal; and
a light amount determiner configured to compare the reference signal with the reference value set by the reference value setter and determine an abnormality in light amount based on whether the reference signal is equal to or larger than the reference value.

3. The absorbance detector according to claim 2, wherein
the optical system includes a spectrometer that separates light that has been transmitted through the sample cell into wavelength components,
the photo sensor has a plurality of light receiving elements that respectively detect light of each wavelength component that is separated by the spectrometer,
the reference value setter is configured to set the reference value in regard to a specific wavelength that is selected in accordance with a mobile phase flowing through the sample cell, and
the light amount determiner is configured to determine an abnormality in light amount by comparing a reference signal of light of the specific wavelength out of reference signals of the light of wavelength components acquired by light receiving elements of the photo sensor.

4. The absorbance detector according to claim 1, wherein
the optical system includes a spectrometer that separates light that has been transmitted through the sample cell into wavelength components,
the photo sensor has a plurality of light receiving elements that respectively detect light of each wavelength component separated by the spectrometer, and
the analysis data storage is configured to store only a reference signal of light of a partial wavelength component out of reference signals of the light of wavelength components acquired by light receiving elements of the photo sensor.

5. The absorbance detector according to claim 1, wherein
the abnormality determiner determines that the sample cell is contaminated at a point in time at which a continuous analysis is started in a case where the absorbance shows a decreasing trend while intensity of the reference signal shows an increasing trend each time an analysis is carried out, determines that a light amount of the light source is unstable in a case where the absorbance shows an increasing trend while the intensity of the reference signal shows a decreasing trend each time an analysis is carried out, and/or determines that the optical system is contaminated in a case where the absorbance does not change while the intensity of the reference signal shows a decreasing trend each time an analysis is carried out.

6. A liquid chromatograph comprising:
a sample injector for injecting a sample into an analysis flow path through which a mobile phase flows;
a separation column that is provided at a position farther downstream than the sample injector on the analysis flow path and is to separate the sample injected into the analysis flow path by the sample injector; and
the absorbance detector according to claim 1 that is provided at a position farther downstream than the sample injector on the analysis flow path and is to detect a sample component eluted from the separation column.

7. An abnormality determination method to be performed in a liquid chromatograph, the liquid chromatograph comprising:
- a sample cell through which a sample solution including a sample flows;
- a light source for irradiating the sample cell with light;
- a photo sensor for detecting intensity of light that has been transmitted through the sample;
- an optical system for guiding the light emitted from the light source to the sample cell and guiding the light that has been transmitted through the sample cell to the photo sensor;
- a reference signal acquirer configured to acquire a detection signal of the photo sensor when the sample solution is not flowing through the sample cell as a reference signal for each analysis of the sample; and
- a calculator configured to find absorbance of the sample flowing through the sample cell based on a measurement signal obtained by the photo sensor in the analysis and the reference signal acquired for the analysis when the analysis of the sample is carried out, and the abnormality determination method including:
associating data of the absorbance found by the calculator in the analysis of the sample and data of the reference signal acquired for the analysis to each other for storage; finding an increasing or decreasing trend of the absorbance and an increasing or decreasing trend of the reference signal associated with an increase in number of analyses based on the stored absorbance of each analysis and the stored reference signal in a case where an analysis of a same sample is carried out multiple times; and determining presence or absence of an abnormality in the sample cell, the light source or the optical system based on a combination of the increasing or decreasing trend of the absorbance and the increasing or decreasing trend of the reference signal.

8. The abnormality determination method according to claim 7, wherein the determining presence or absence of an abnormality includes determining that the sample cell is contaminated at a point in time at which a continuous analysis is started in a case where the absorbance shows a decreasing trend while intensity of the reference signal shows an increasing trend each time an analysis is carried out, determining that a light amount of the light source is unstable in a case where the absorbance shows an increasing trend while the intensity of the reference signal shows a decreasing trend each time an analysis is carried out and/or determining that the optical system is contaminated in a case where the absorbance does not change while the intensity of the reference signal shows a decreasing trend each time an analysis is carried out.

* * * * *